E. Bigelow,

Syrup Fountain,

No. 2,406. Reissued Dec. 4, 1866

Witnesses;
David Ellarsh
Benj. E. Lawson

Inventor;
E. Bigelow

N. PETERS, PHOTO-LITHOGRAPHER WASHINGTON, D. C.

United States Patent Office.

IMPROVED APPARATUS FOR SUPPLYING AND MEASURING SIRUPS IN SODA WATER.

EDMUND BIGELOW, OF SPRINGFIELD, MASSACHUSETTS.

*Letters Patent dated April* 6, 1858; *reissue No.* 547, *dated May* 4, 1858; *reissue No.* 2,406, *dated December* 4, 1866.

SPECIFICATION.

Be it known that I, EDMUND BIGELOW, of Springfield, in the county of Hampden, and State of Massachusetts, have invented a new and improved Apparatus by which Sirups and such like articles are supplied and measured with facility, in vending at retail Soda Water and other analogous articles; and I do hereby declare and ascertain my said invention as follows, referring to the accompanying drawing illustrating the same.

Figure 1:
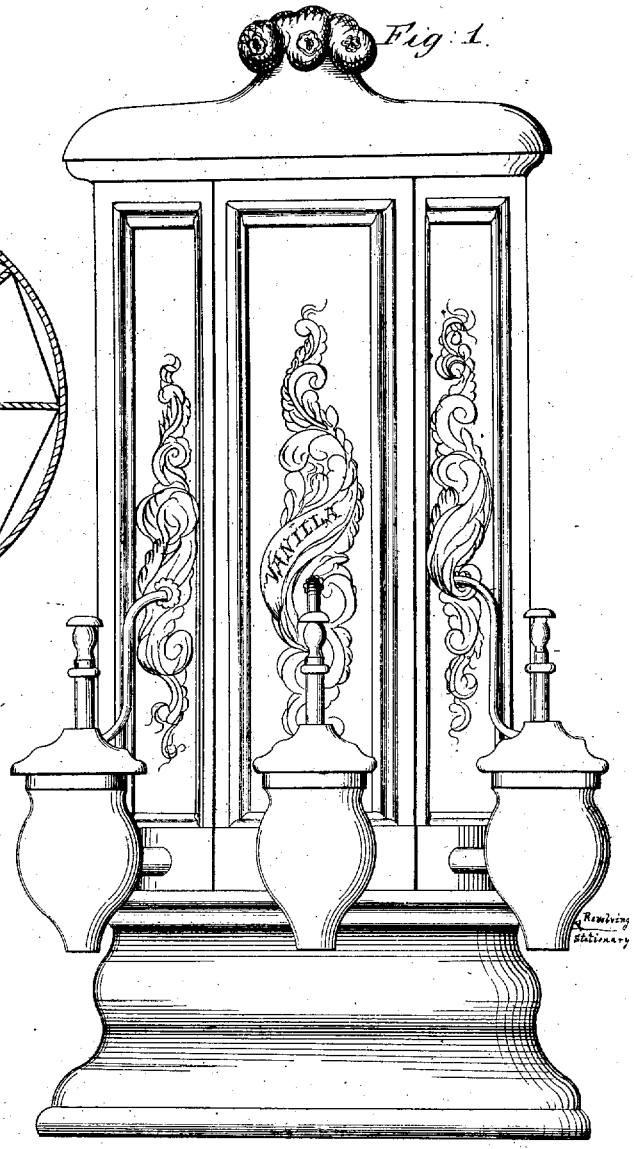

It is obvious from the nature of the invention that the form of the apparatus may be varied indefinitely, and that its position relatively to the soda or other fountain may be such as convenience and experience suggest, the nature of the invention being the provision of any desired number of apartments, reservoirs, or separate chambers, to be filled with sirups or other liquids used as a beverage, and having a measuring faucet affixed to each reservoir, so as to draw from it and at the same time measure a given quantity of the fluid contained therein without removing or handling said reservoir, which is set in contact with or adjacent to ice, by which its contents are kept cool, by which I greatly improve and facilitate the retailing beverage, and economize the sirups, &c., used therein. The reservoirs may be placed in a line side by side in a permanent or rotating stand on a base of proper height, or otherwise arranged, as desired. The construction and arrangement shown in the accompanying drawings are as follow:

Figure 1 is an elevation of a circular stand of reservoirs with an ornamented exterior case.

Figure 2:
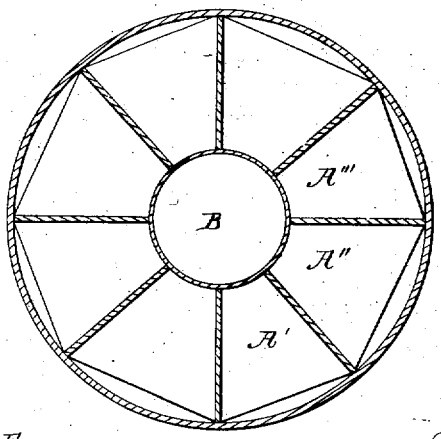

Figure 2 is a transverse section showing a plan of the reservoirs, shaped to adapt them to their location, and lettered A A. In the centre space that the reservoirs, A, surround, there is the receptacle for ice, B, for cooling the contents of the reservoirs. This stand may be made stationary, or to revolve by pivoting it on the base.

Figure 3:
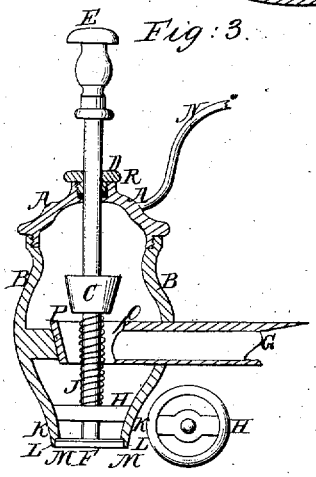

Figure 3 shows a form of measuring faucet that I have devised for affixing to each of the sirup reservoirs, A, above named, and projecting from the stand, as seen at F, fig. 1.

The construction of this faucet is as follows: *a* is the top of the registering or measuring chamber; *b* is the body thereof; *c* is a conical valve on a rod, *d*; *e* is a head or thumb-piece affixed to the upper end of valve rod *d* to depress it by; *f* is a valve on the lower end of rod *d*, made in two parts, with a leather or other packing, that rests on the valve seat when the valve is closed; *o* is an opening in the pipe, *g*, that forms the communication between the reservoir, A, and the measuring chamber, into which the conical valve, *c*, is fitted; a bar, *h*, serves to guide the lower end of the rod, *d*, the upper end of which passes out through a packing-box, *r*, at the top of the register; *j* is a spiral spring that rests on the bar, *h*, and bears up against the valve, *c*, keeping it raised from its seat or open, and the valve, *f*, closed, as shown in the drawing, leaving the communication open between the reservoir and measuring chamber, by which the latter is filled. When the contents of the measuring faucet are to be drawn off, the rod, *d*, is depressed, forcing the valve, *c*, down to its seat, and thus cutting off the communication with the reservoir, A, and at the same time opening the valve, *f*, to discharge the measured contents of the faucet. By removing the pressure from rod *d*, the spring throws up the rod *d*, closing valve *f* and opening valve *c*, by which action the measuring chamber again fills. To enable the chamber of the faucet to fill and discharge, it is necessary to have a vent therein, which may be at any convenient and proper point; a tube, shown at *n* in the drawing, should extend from the vent up to the top of the reservoir, A, or other convenient point, that will prevent the overflow of the contents of the reservoir when it is filled. This combination of reservoirs filled with iced liquids and measuring faucets dispenses with the fragile portable sirup bottles heretofore used, enabling the vender to dispense his beverage much more expeditiously, and prevents the injury of the sirups by the heat of the atmosphere, while it furnishes the beverage to the consumer several degrees cooler than by the old method; and it prevents the waste of sirup that always attends the use of ordinary bottles, by spilling, &c.

Having thus fully described my invention or improvement, what I claim, and desire to secure by Letters Patent, is—

The employment of reservoirs in permanent cases or stands, revolving or otherwise, as herein described, with the registering faucets, substantially as and for the purposes herein set forth.

I also claim a self-registering apparatus, with an air tube or vent, substantially as herein set forth, combined with a reservoir, as and for the purposes herein described.

EDMUND BIGELOW.

Witnesses:

J. J. GREENOUGH,

STEPHEN G. CLARKE.